J. MELIO.
AUTOMOBILE FENDER.
APPLICATION FILED MAR. 18, 1916.
1,194,409.
Patented Aug. 15, 1916.
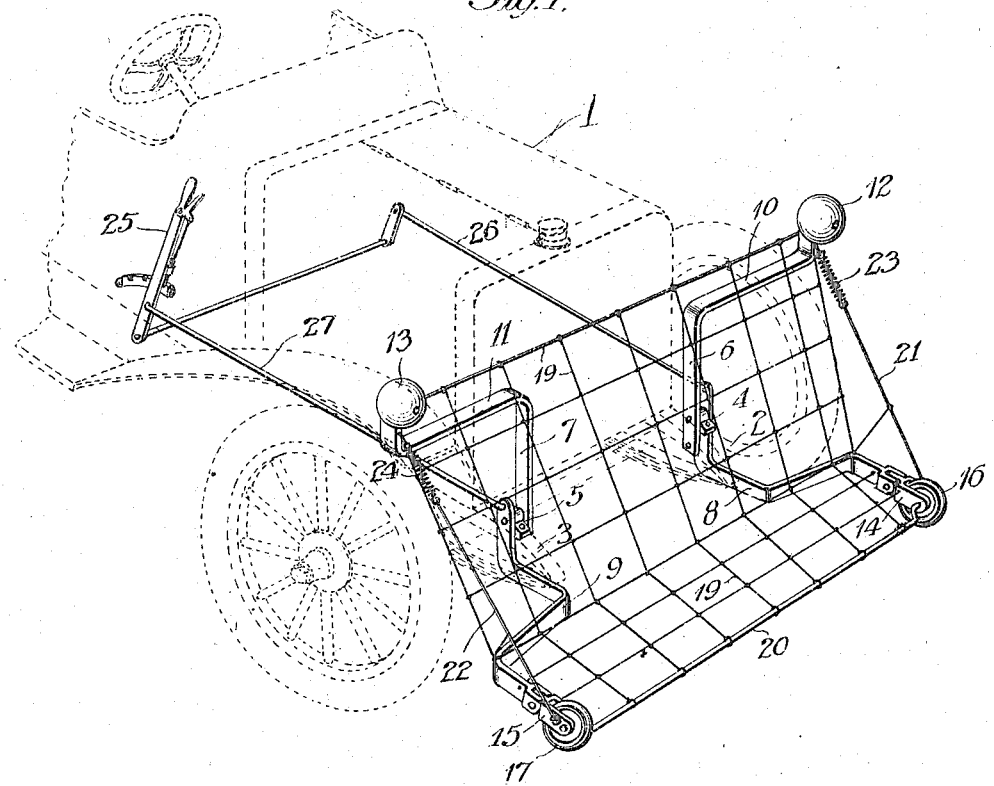
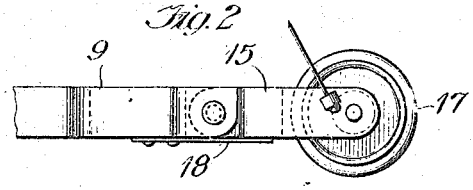
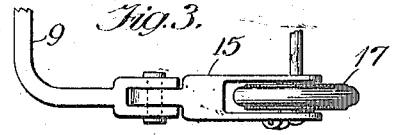
Witnesses
Martin H. Olsen.
William E. Hann.
Inventor
James Melio
By Rummler & Rummler
Attys

UNITED STATES PATENT OFFICE.

JAMES MELIO, OF CHICAGO, ILLINOIS.

AUTOMOBILE-FENDER.

1,194,409.　　　Specification of Letters Patent.　　Patented Aug. 15, 1916.

Application filed March 18, 1916. Serial No. 85,034.

*To all whom it may concern:*

Be it known that I, JAMES MELIO, a citizen of the United States of America, and a resident of Chicago, county of Cook, and State of Illinois, have invented certain new and useful Improvements in Automobile-Fenders, of which the following is a specification.

The main objects of this invention are to provide an improved form of vehicle fender particularly adapted for use on automobiles.

An illustrative embodiment of this invention is shown in the accompanying drawings, in which—

Figure 1 is a view of the complete device in perspective, shown attached to the front of an automobile. Fig. 2 is an enlarged side elevation of one of the yieldingly mounted tips. Fig. 3 is a top plan of the same.

In the construction shown in the drawings, the fender is attached to the front end of an automobile 1, of standard construction, preferably to the forwardly projecting arms 2 and 3 of the chassis, by means of clips 4 and 5 secured to the chassis by bolts or other suitable means.

The framework of the fender comprises a pair of upstanding rigidly mounted arms 6 and 7 and a pair of pivotally mounted forwardly projecting arms 8 and 9. Arms 6 and 7 are offset outwardly near the tops thereof, forming horizontal parts 10 and 11 which extend outwardly as far as the outer edge of the mud guards so as to serve as a protection therefor. The outer tips of said arms are bent upwardly and are surrounded by bumpers or shields in the form of rubber balls 12 and 13. The arms 8 and 9 extend forwardly and somewhat downwardly and are offset in a manner similar to the upstanding arms 6 and 7. The outer ends of the arms 8 and 9 are provided with pivotally mounted tips or extensions 14 and 15, carrying rollers in the form of small wheels 16 and 17 respectively. The pivotally mounted tips 14 and 15 are held in substantial prolongation of their respective arms by means of resilient leaf springs 18 rigidly mounted at one end on the arms, the other end of each of said springs being in position to yieldingly support the tips, while allowing them to rock downwardly to bring the wheels 16 and 17 in contact with the ground. The upstanding and forwardly projecting arms form a framework over which a network 19 is stretched, the lower front edge of the network being attached to a bar 20, mounted at its opposite ends on tips 14 and 15. The network 19 is arranged so as to form a slightly sloping back part and a substantially horizontal floor part, the whole being approximately L-shaped in side elevation. Strands 21 and 22 are connected from the ends of the upstanding arms to the yieldingly mounted tips on the forwardly projecting arms, said strands having coiled springs 23 and 24 interposed therein, so as to allow the tips to rock downwardly when an object is supported by the fender. The hereinbefore described arrangement of framework and network forms a fender somewhat resembling an outwardly facing basket. The main purpose, however, of having the side strands 21 and 22 resilient is to cause objects struck by them to be either thrown clear of the vehicle or into the network basket. The arms 8 and 9 and the network supported thereon may be swung upward out of the way by suitable means, such as an operating handle 25 connected by links 26 and 27 to said arms.

In the operation of the device, the forwardly projecting arms 8 and 9 may be lowered to the position shown in Fig. 1, by means of the operating handle 25. In this position, the wheels 16 and 17 are a few inches from the surface upon which the vehicle is traveling. If a person or other object were to be run into, he would be scooped up in the network basket. If the person were at the side of the path of the vehicle, he would be struck by the resilient strands 21 and 22 and possibly by the rubber balls 12 and 13, and thereby be caused to fall out of the path of the vehicle or into the network basket. The yielding mounting of the tips 14 and 15 allows the lower front edge of the network and the cross bar 20 to yield under a load, bringing the wheels 16 and 17 into contact with the ground and enabling the arms to readily pass over projections, etc.

Although but one specific embodiment of this invention has been herein shown and described, it will be understood that the construction may be altered and details omitted without departing from the spirit of this invention as defined by the following claims.

I claim:—

1. A fender of the class described, comprising a pair of upstanding supporting arms adapted to be attached to a vehicle, a pair of forwardly projecting arms, the inner ends of said forwardly projecting arms being adapted to be attached to said vehicle and the outer ends of said arms being disposed in close proximity to the base line of the vehicle to which they are attached, members mounted on the ends of said forwardly projecting arms, and normally held in spaced relation above the base line of such vehicle, said members being mounted for movement in a downward direction from said normal position when a weight is placed thereon so as to contact with the surface upon which such vehicle may be supported, yielding means for resisting such downward movement, said upstanding arms and forwardly projecting arms forming a framework, and a network attached to said framework.

2. A fender of the class described, comprising a pair of upstanding supporting arms adapted to be attached to a vehicle, a pair of forwardly projecting arms, the inner ends of said forwardly projecting arms being adapted to be attached to said vehicle and the outer ends of said arms being disposed in close proximity to the base line of the vehicle to which they are attached, said upstanding arms and forwardly projecting arms forming a framework, and a network attached to said framework forming an outwardly facing basket and comprising resilient means connecting said upstanding and forwardly projecting arms and forming the sides of said basket substantially as and for the purpose set forth.

3. A fender of the class described, comprising a pair of upstanding supporting arms adapted to be attached to a vehicle, a pair of forwardly projecting arms, the inner ends of said forwardly projecting arms being adapted to be attached to said vehicle and the outer ends of said arms being disposed in close proximity to the base line of the vehicle to which they are attached, said upstanding arms and forwardly projecting arms forming a framework, and a network attached to said framework forming an outwardly facing basket, the outer strand on each side of said network being located in front of the intermediate strands and being provided with a resilient spring substantially as and for the purpose set forth.

4. A fender of the class described, comprising a pair of upstanding supporting arms adapted to be attached to a vehicle, a pair of forwardly projecting arms, the inner ends of said forwardly projecting arms being adapted to be attached to said vehicle and the outer ends of said arms being disposed in close proximity to the base line of the vehicle to which they are attached, members yieldingly mounted on the ends of said forwardly projecting arms, said upstanding arms and forwardly projecting arms forming a framework, and a network attached to said framework forming an outwardly facing basket, the outer strands on each side of said network being attached to said yieldingly mounted members and each of said strands being provided with a resilient spring to permit said members to yield.

Signed at Chicago this 16th day of Mar. 1916.

JAMES MELIO.